United States Patent
Fedak

(10) Patent No.: US 11,017,385 B2
(45) Date of Patent: May 25, 2021

(54) ONLINE TRANSACTIONS

(71) Applicant: NCR Corporation, Duluth, GA (US)

(72) Inventor: Jan Fedak, Colleyville, TX (US)

(73) Assignee: NCR Corporation, Atlanta, GA (US)

( * ) Notice: Subject to any disclaimer, the term of this patent is extended or adjusted under 35 U.S.C. 154(b) by 824 days.

(21) Appl. No.: 14/697,774

(22) Filed: Apr. 28, 2015

(65) Prior Publication Data

US 2016/0321650 A1 Nov. 3, 2016

(51) Int. Cl.
- *G06Q 20/38* (2012.01)
- *G06Q 20/40* (2012.01)
- *G06Q 20/12* (2012.01)
- *G06Q 20/34* (2012.01)

(52) U.S. Cl.
CPC ......... *G06Q 20/3821* (2013.01); *G06Q 20/12* (2013.01); *G06Q 20/351* (2013.01); *G06Q 20/385* (2013.01); *G06Q 20/401* (2013.01)

(58) Field of Classification Search
CPC .............................. G06Q 20/385; G06Q 20/12
See application file for complete search history.

(56) References Cited

U.S. PATENT DOCUMENTS

| | | | | |
|---|---|---|---|---|
| 6,327,578 B1* | 12/2001 | Linehan | ............... | G06Q 20/02 705/65 |
| 2002/0073045 A1* | 6/2002 | Rubin | ............... | G06Q 20/367 705/65 |
| 2005/0086164 A1* | 4/2005 | Kim | ............... | G06Q 20/102 705/40 |
| 2008/0040265 A1* | 2/2008 | Rackley, III | ........... | G06Q 20/02 705/40 |
| 2008/0040270 A1* | 2/2008 | Buchheit | ................ | G06Q 20/28 705/41 |
| 2010/0088237 A1* | 4/2010 | Wankmueller | ......... | G06Q 20/12 705/75 |
| 2012/0095865 A1* | 4/2012 | Doherty | ............. | G06Q 30/0641 705/26.8 |
| 2012/0124676 A1* | 5/2012 | Griffin | ................... | G06Q 20/12 726/28 |
| 2012/0191569 A1* | 7/2012 | Shah | .................... | G06Q 20/405 705/26.41 |
| 2013/0018785 A1* | 1/2013 | Dolphin | ................ | G06Q 20/10 705/40 |

(Continued)

FOREIGN PATENT DOCUMENTS

WO WO-2013144930 A1 * 10/2013 ............. G06Q 20/16

OTHER PUBLICATIONS

L. Kyrillidis, K. Mayes, B. Chazalet and K. Markantonakis, "Card-Present Transactions on the Internet Using the Smart Card Web Server," 2013 12th IEEE International Conference on Trust, Security and Privacy in Computing and Communications, Melbourne, VIC, 2013, pp. 611-619. (Year: 2013).*

*Primary Examiner* — Jacob C. Coppola

(74) *Attorney, Agent, or Firm* — Schwegman, Lundberg & Woessner

(57) ABSTRACT

Methods, systems, and apparatus, including computer program products, for online transactions. A web page of an online store includes a payment option that allows a payment application on a user device to pay for the merchandise using card payment information that does not include the account number of the card or require that the account number be shared with the online store merchant.

7 Claims, 4 Drawing Sheets

(56) References Cited

U.S. PATENT DOCUMENTS

| | | | |
|---|---|---|---|
| 2013/0124422 A1* | 5/2013 | Hubert | G06Q 20/3827 705/71 |
| 2013/0144731 A1* | 6/2013 | Baldwin | G06Q 20/20 705/17 |
| 2015/0032627 A1* | 1/2015 | Dill | G06Q 20/385 705/44 |
| 2015/0095992 A1* | 4/2015 | Metral | H04L 63/10 726/5 |
| 2015/0100476 A1* | 4/2015 | Agapitov | G06Q 20/123 705/39 |
| 2015/0186973 A1* | 7/2015 | Athimoolam | G06Q 30/0625 705/26.62 |

\* cited by examiner

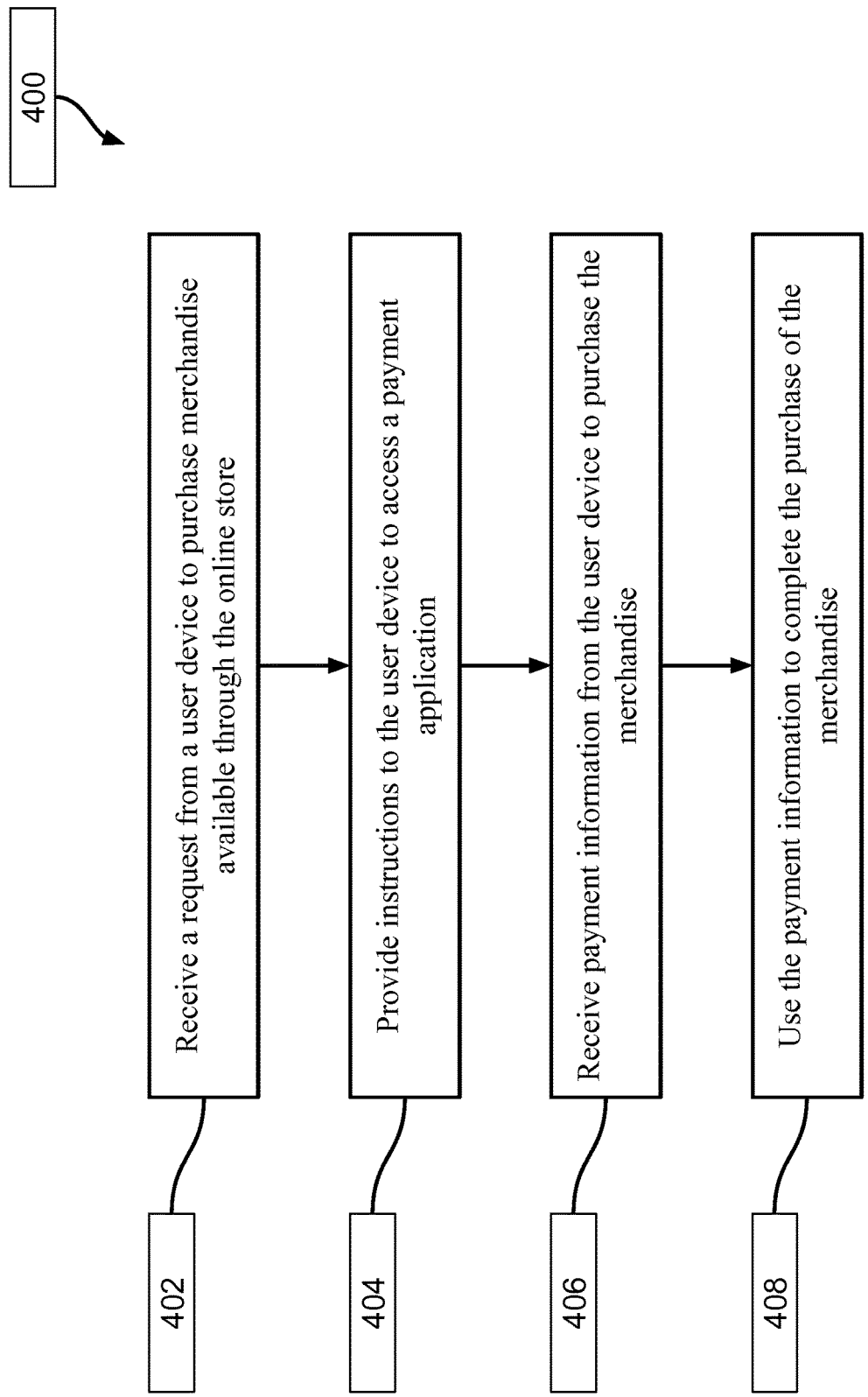

ONLINE TRANSACTIONS

BACKGROUND

This specification relates to online transactions including payments for goods and/or services purchased online.

With the proliferation of online stores web-based (online) purchasing transactions are becoming commonplace. Such a transaction may involve paying for the purchased good or service with a credit or debit card. This payment process often requires the purchaser to enter and submit the purchaser's credit or debit card information (e.g., card number, expiration date, and/or card security code) into an online payment form (e.g., accessible through the purchaser's computer or mobile device) provided by the web-based merchant.

To complete the purchase, the card information is entered into a web form and transmitted across a network such as, for example, the Internet, to a financial institution (e.g., the card issuer and/or a bank facilitating the transaction) to authorize the purchase. Transmitting the card information across the network potentially exposes the purchaser's card information to, for example, theft by those that can intercept or inspect the network communications carrying the card information. Although security techniques can be employed to mitigate the risk (e.g., through encryption schemes), such over-the-network theft remains a real concern.

SUMMARY

In general, the subject matter of this specification describes technologies relating to online purchases, e.g., purchasing goods or services through a web page. In some implementations the, the online purchase process leverages secure payment capabilities natively implemented in user devices.

In general, one aspect of the subject matter described in this specification can be implemented in methods that include receiving, at one or more servers hosting an online store, a request from a user device to purchase merchandise available through the online store. Providing instructions to the user device to access a payment application to pay for the merchandise; receiving payment information from the user device to purchase the merchandise, where the payment information is generated from information from a payment card and the payment application on the user device causes the payment information to be provided, and wherein the payment information does not include an account number of the payment card. The method can further include using the payment information to complete the purchase of the merchandise, and completing the payment process without use of the account number of the payment card.

The method can include the payment application causing the payment information to be provided to the one or more servers by native functionality of the user device, and receiving the request to purchase merchandise via (e.g., by way of) the one or more webpages from a web browser on the user device. In one or more implementations, the payment application is not a web browser application and/or the payment information is a token having a same number of characters as the account number of the payment card, and the characters of the token are different from those of the account number.

The method can include providing to the payment application a cost of the merchandise. The method can include receiving from the payment application a confirmation that the merchandise has been paid for.

Particular implementations of the subject matter described in this specification can be implemented so as to realize one or more of the following advantages. For example, the security of purchasing products and/or services through a merchant's website (e.g., online store) with a credit or debit card can be enhanced because the purchaser's card information is not shared with the merchant or otherwise transmitted across the Internet (or other network) to complete the purchase. Thus the security of online purchasing transactions is enhanced while allowing the purchaser the convenience of online shopping (e.g., at the merchant's website).

Card issuers generally charge (e.g., merchants) for processing card transactions on a per transaction basis. A portion of these charges may be attributed to mitigating the costs associated with addressing fraudulent purchases (e.g., unauthorized purchases using stolen card information). The enhanced security afforded by the online transaction process described herein can reduce the occurrence of fraudulent purchases by reducing the opportunity for card information theft during online purchases—as card information (e.g., the credit card account number) is not shared or transmitted across the Internet during the purchase process. This, in turn, can reduce the transaction costs (and card issuer's charges) associated with online purchases by reducing the number of fraudulent purchases for which card issuers' need to account and mitigate.

Consumers may view online transactions described herein more convenient because they do not have to re-enter payment information when making a new purchase or possibly even making purchase with a new online merchant/store.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 4 is a flow diagram for an example method for conducting an online transaction.

Like reference symbols in the various drawings indicate like elements.

DETAILED DESCRIPTION

Figure 1:
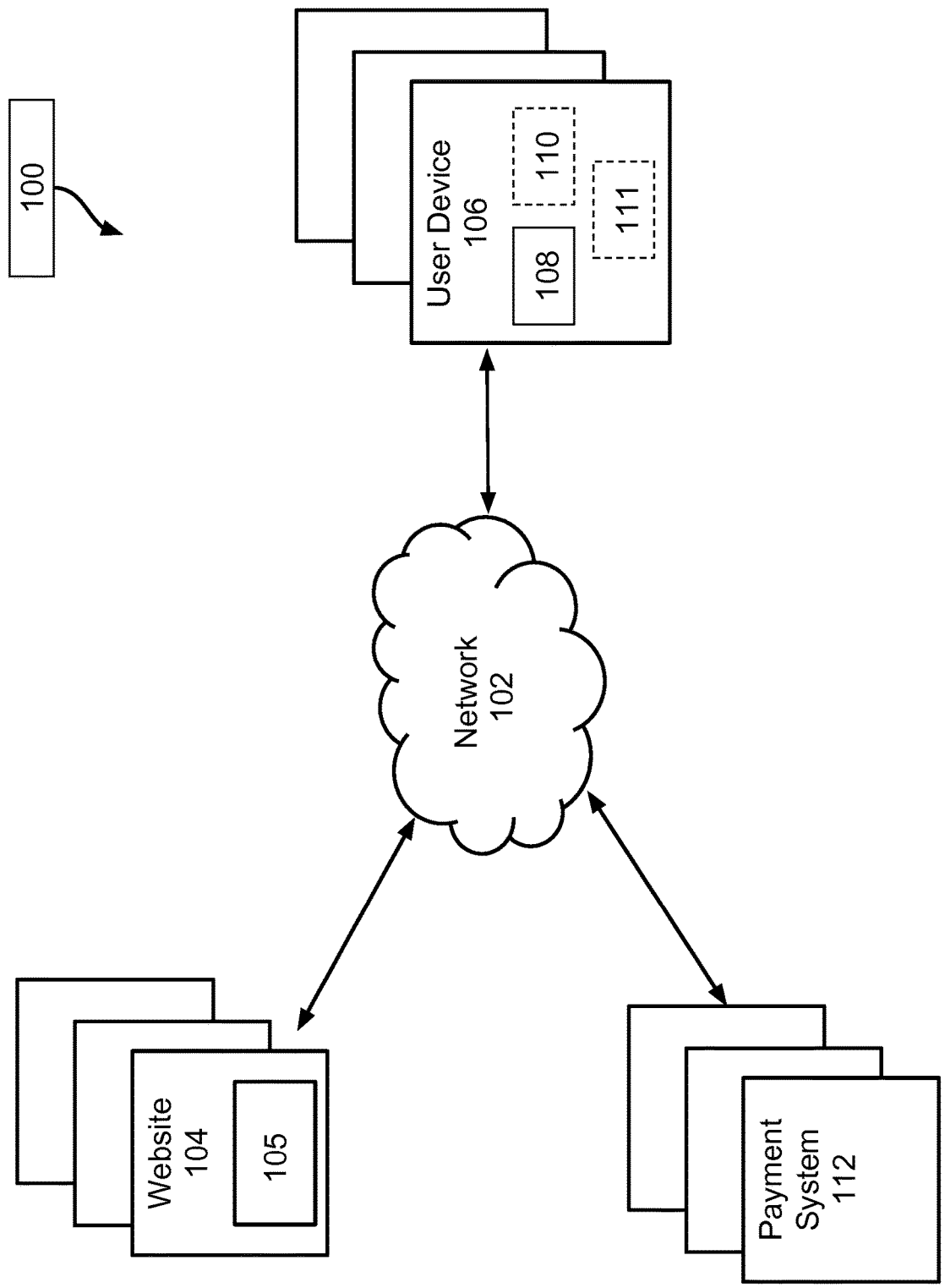
FIG. 1 is a block diagram of an example environment in which online transactions can occur.

This specification relates to facilitating and enhancing the security of online transactions such as, for example, purchase transactions for products and/or services through an online store. An online store describes a form of electronic commerce that enables consumers to directly buy goods or services from a merchant over the Internet using a web browser or other application. An online store, at least in part, is made up of one or more web pages or, more generally, resources as described below. A web page is a document on the World Wide Web and/or accessible through the Internet. For example, a web page is a document annotated with a markup language that is provided to or accessible by a user device over a network, such as the Internet. An exemplary web page is an HTML document that can be rendered on the user device by use of a web browser.

More specifically, this specification describes systems and methods that allow a user to purchase merchandise though web pages (e.g., online stores) without having to provide the user's payment card or certain payment card information (e.g., account number, expiration date and/or security code) to the merchant or otherwise transmit the user's payment card information across the Internet. In some implementations, this is accomplished by providing a payment option in the online store (e.g., a selectable button on a web page) that causes a payment application to be invoked on the user's device (or downloaded and then invoked if the user device does not have the payment application).

Upon selecting such button, control may be passed from the web pages to the payment application on the user's device. In some implementations, this is accomplished by sending a text message with sufficient information to identify the online transaction to the user's device. In some implementations, this is accomplished by sending an email to the user's device. In some implementations, this is accomplished by sending a notification to the payment application on the user's device. In some implementations, where the web browser used to perform the online transaction is already running on the user's device, control can be directly handed over to the payment application by navigating to a specially crafted URL or invoking a web browser extension.

The payment application retrieves information about the requested transaction from the online store, performs the payment process (e.g., using native, secure user device functionality) and confirms that the payment has been made. The payment process can include returning a token (or other data representing the payment card or payment card information) to the online store, which is used to authorize the purchase. The token (or other data) does not have or include, for example, the account number of the payment card (and/or other identifying information related to the card such as cardholder's name and address, personal identification number, and/or expiration date). In some implementations, the online store processes the token as it would a normal credit card (or debit card) purchase transaction (e.g., the token is sent to the card issuer/payment server to authorize the charge). Thus the standard purchase flow is maintained but the underlying payment card account number is not divulged to the online store or transmitted over the Internet, which enhances the security of the transaction.

In some implementations, the standard purchase flow can be modified where the payment application completes the purchase directly with a payment system and merely passes confirmation of the completed payment to the website (e.g., online store). In such implementations, the website must have means to validate that the payment has indeed been processed in the payment system and that it was related to the online transaction. In some implementations, one-way hash codes or cryptographic signatures may be used to issue such proof. In other applications, a verification call from website to payment system may be used.

FIG. 1 is a block diagram of an example environment 100 in which online transactions can occur. The example environment 100 includes a network 102, e.g., a local area network (LAN), wide area network (WAN), the Internet, or a combination of them, that connects websites 104, user devices 106, and a payment system 112. The environment 100 may include many thousands of websites 104 and user devices 106.

A website 104 is one or more resources associated with a domain name and hosted by one or more servers. An example website 104 is a collection of web pages formatted in hypertext markup language (HTML) that can contain text, images, multimedia content, and programming elements, e.g., scripts. Each website 104 is maintained by a publisher, e.g., an entity that manages and/or owns the website.

A resource is any data that can be provided by the website 104 over the network 102 and that is associated with a resource address. Resources include HTML pages, word processing documents, and portable document format (PDF) documents, images, video, and feed sources, to name just a few. The resources can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers (desktop and laptop computers), mobile communication devices such as mobile phones and tablets, and other devices that can send and receive data over the network 102. A user device 106 typically includes a user application 108, e.g., a web browser, to facilitate the sending and receiving of data over the network 102 including accessing and rendering/displaying web pages and other resources.

A user device 106 includes a payment application 110. A payment application 110 is software, a computer program or other executable code that facilitates the payment for goods and/or services purchased through use of the user device 106. In some implementations, the payment application 110 is not a web browser. A payment application 110 can be written in, for example, the C, C++, Java, and Objective-C programming languages, to name just a few, and accessed by a user through a graphical user interface on the user device 106. The payment application 110 or user device 106 (e.g., through its native hardware and/or software 111) or payment system 112 stores payment information for payment cards. As mentioned above, such payment information is used to facilitate enhanced-security purchase transactions.

In some implementations, the payment information of a payment card (e.g., credit card or debit card) is or includes a token. The token has a token number that is different from, but can be used to identify, the account number of and/or other information (e.g., card holder name and address, personal identification number, expiration date) associated with the payment card. For example, the token number can be random with respect to the account number or can be cryptographically derived from the account number. In some implementations, the token has a set of characters (e.g., alphanumeric characters), as opposed to a number or set of numbers, that is used to identify the account number of and/or other information associated with of the payment card. The number of characters or digits in the token number can be the same as those of the account number that it is associated with to, for example, enable a typical payment card verification process to handle the token-based transaction. This permits the token to be processed in a manner similar (or the same) to that of account number based payments, which reduces the need to change the account-number based systems and processes (e.g., to handle a token number with more or less digits than an account number)— thus reducing or eliminating the costs associated with such a change while enabling the enhanced security afforded by using the token. In some implementations, the token number can have more or less digits than an account number.

The payment system 112 is a data processing apparatus (e.g., computer system) through which the purchase transaction is authorized, for example, by the card issuer (i.e., the company that issues the payment card to the card holder) or other approving financial institution. The payment system 112 includes a data processing apparatus of the card issuer and, in some implementations, a data processing apparatus of a financial institution that processes transactions for the card issuer. In some implementations, once a cardholder has initiated a purchase transaction through an online store, the online store, through its software and systems, submits an authorization request for the transaction to the payment system 112 across the network 102. In turn, the payment system 112 verifies that the cardholder's account has sufficient available credit or funds (and/or is otherwise authorized) for the purchase, for example, by querying a database storing the cardholder's account information. If the payment system 112 verifies that credit or funds are available for the purchase, the payment system 112 authorizes the transaction and notifies the online store accordingly to complete the purchase. Conversely, if the payment system 112 determines that credit or funds are not available for the purchase, the payment system 112 notifies the online store that the authorization request is denied—preventing the purchase transaction from consummating.

In some implementations, the payment system 112 and the servers hosting the online store (e.g., online store 200 mentioned below) are part of the same system.

In some implementations, the payment application 110 directly initiates the payment with payment system 112. The payment system 112 notifies the payment application 110 whether the requested purchase transaction is authorized or not. In turn, the payment application 110 notifies the online store of the same.

Figure 2:
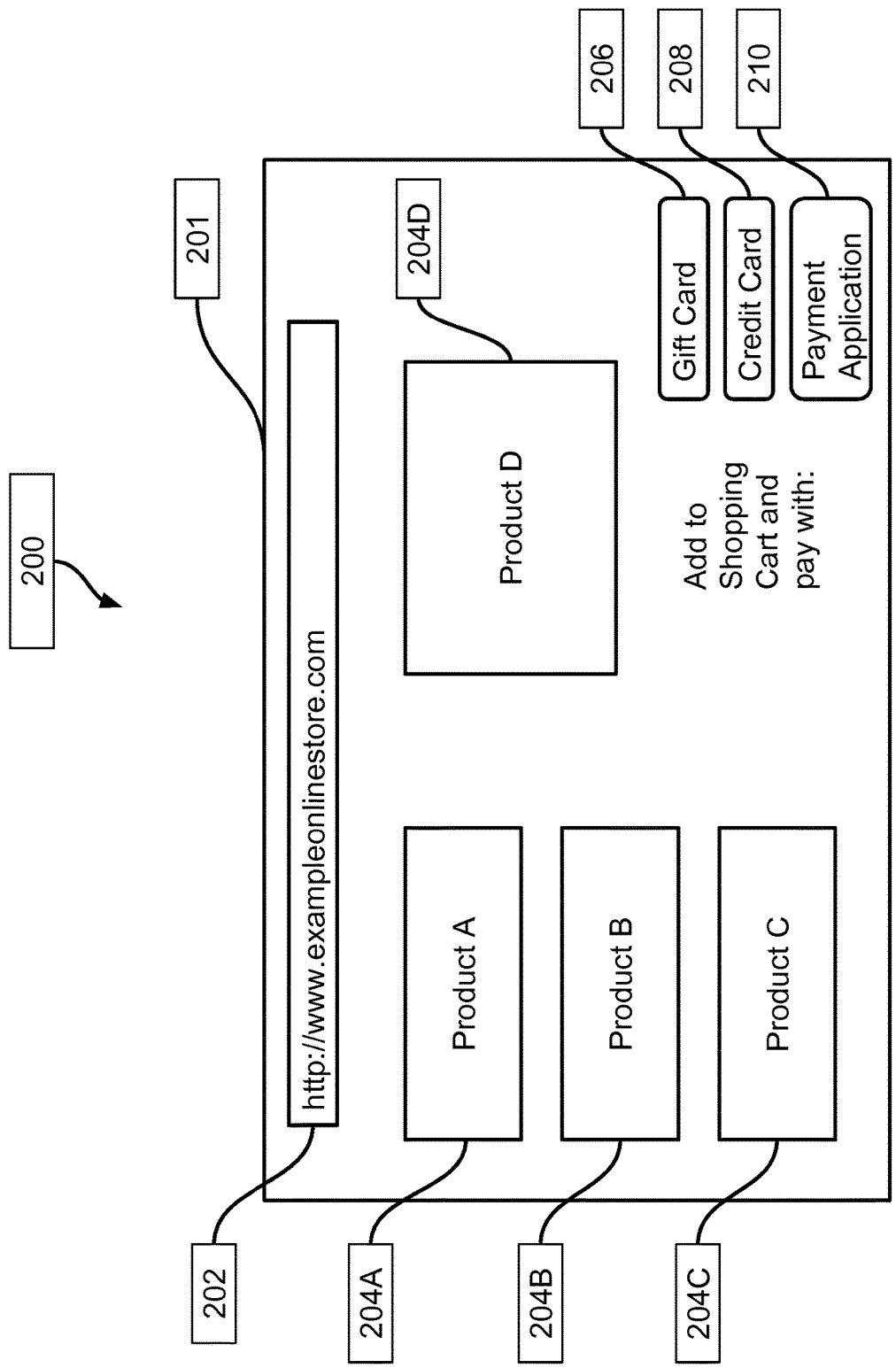
FIG. 2 illustrates an example display of a web page through which an online transaction can occur.

FIG. 2 illustrates an example display of a web page 201 through which an online transaction can occur. The web page 201 is the graphical interface to the online store 200, and is hosted by one or more servers. The online store 200 may include many web pages, for example, with each web page devoted to different merchandise. The web page 201 can be accessed, for example, by a browser 108 on the user device 106 requesting the content available at the uniform resource locator 202 (www.exampleonlinestore.com). The online store 200 describes the functionality that enables a purchase transaction to be conducted between the user of the user device 106 and the merchant (e.g., individual or corporate entity) running the online store 200 to, for example, allow the user to purchase (including paying for) products or services advertised on the web page 201. Such products and services can, for example, include Products A-D (204A-D in FIG. 2).

The online store 200 also includes one or more options to pay for any products or services selected to be purchased by the user. For example, these options can be invoked by a user selecting (e.g., clicking on) a button on the web page 201, and include paying for the selected products or services with a gift card (through selectable element 206), a credit card (through selectable element 208) and through the payment application 110 (through selectable element 210). The user may, for example, decide to purchase Product A 204A and pay for it through the payment application 110 by selecting element 210.

In some scenarios, the user is accessing the online store 200 through a user device 106 such as a laptop or desktop computer. In other scenarios, the user is accessing the online store 200 through the user's mobile device (a user device 106 such as a mobile telephone or a tablet). Regardless, in response to the user selecting payment through the payment application 110, the online store 200 (or another data programming apparatus associated with the online store) accesses an identifier of the user or the user's mobile device. The online store 200 may already have such an identifier (e.g., from previous transactions) and, as such, accesses the identifier from its records. If the online store 200 does not have access to the identifier, then the online store 200 can query the user for such information (e.g., through a pop-up window requesting the identifier or otherwise providing an input device associated with the online store 200 through which the user can input the identifier). The identifier can be, for example, a telephone number, email address, instant message address or another identifier that enables the online store 200 to identify and communicate with the user and/or the user's mobile device. In some implementations, the user's laptop or desktop computer fills the role of the mobile device and uses the payment application 110 to complete the purchase, in a manner similar to that described below.

Once the online store 200 has the user's mobile device identifier (e.g., the telephone number of the mobile device), the online store 200 sends a communication to the mobile device including information (e.g., a link or other instructions) through which the mobile device can access (e.g., invoke and open) the payment application 110. In some implementations, the communication includes information about the transaction such as, for example, an identification of the item to be purchased, an identification of the online store 200, and the cost of the item to be purchased, or instructions to the payment application 110 to otherwise access such information (e.g., by querying the online store 200). If the mobile device does not have the payment application 110, in some implementations, the communication includes instructions to obtain the payment application 110 such as, for example, instructions to obtain the payment application 110 from an application store. The application store includes one or more resources and is remote to and different from the user device 106.

Figure 3:
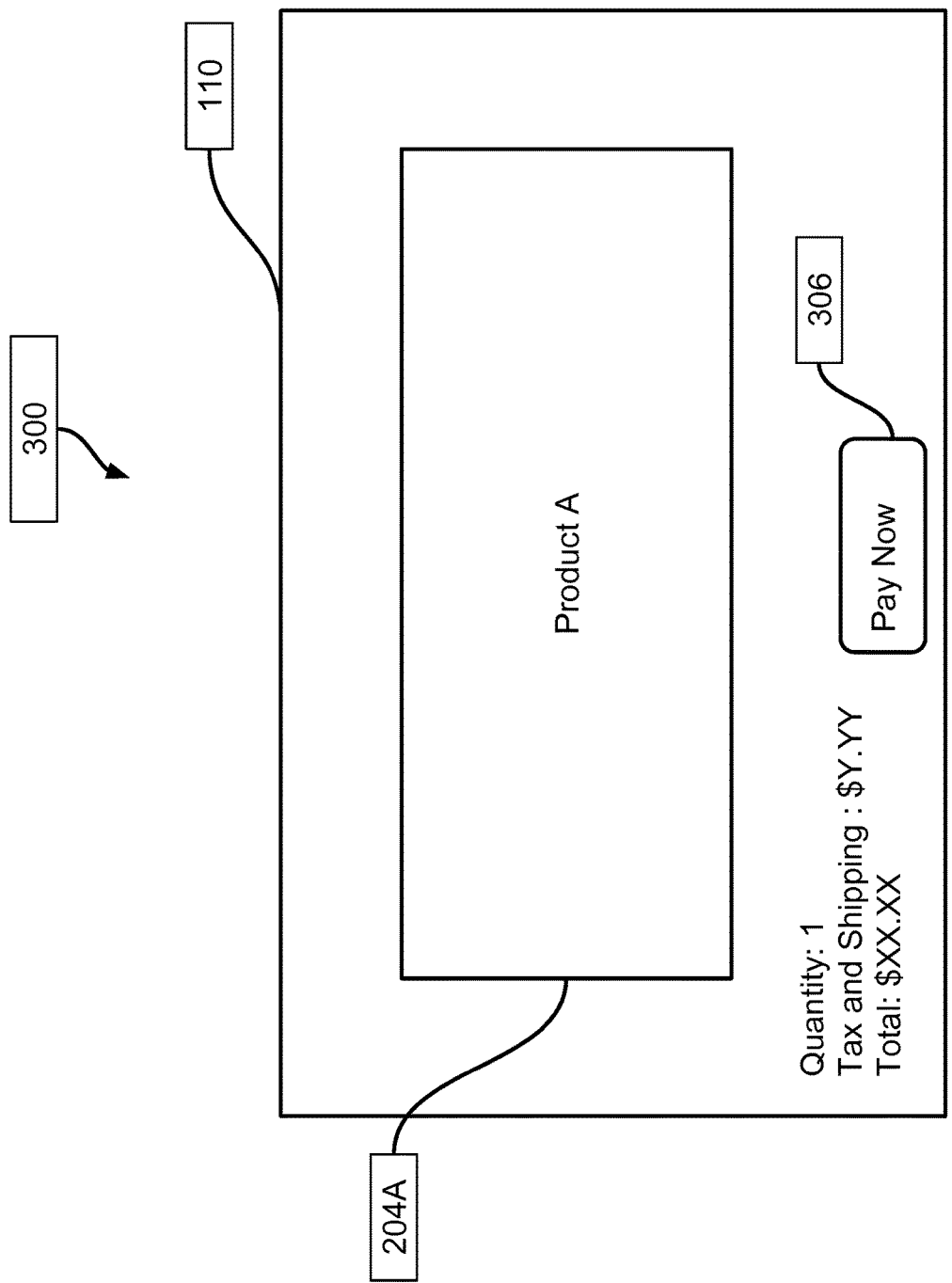
FIG. 3 illustrates an example display from a payment application.

FIG. 3 illustrates an example display 300 from a payment application 110. The payment application 110 in FIG. 3 is accessed by and instantiated on, for example, the user's mobile device (e.g., user device 106). In this example, the user selected Product A 204A to purchase. Accordingly, in some implementations, the payment application 110 reflects that Product A 204A is to be purchased, and that payment for Product A 204A is available through the payment application 110, for example, via selectable element 306 or another input mechanism (e.g., a voice command).

As mentioned above, the payment application 110 has a token that represents the payment card of the user. The token does not include the account number. In some implementations, the token includes a random number with respect to the account number, and the payment system 112 generates the token through use of a random number generator. In some implementations, the token includes a number cryptographically-derived from the account number, and the payment system 112 generates the token through use of a cryptographic algorithm (e.g., symmetric-key or public-key cryptography algorithms). As described below, native functionality of the user device 106, as opposed to the payment application 110, may store and handle the token and/or other payment information.

In some implementations, the payment application 110 obtains the token from the payment system 112. For example, the user can enroll with the payment system 112 (e.g., through the payment application 110 or through a web page of the payment system 112) to set up the token-based payment process of the payment application 110. In some implementations, the enrollment process includes the user entering the payment card account number (and, optionally, other information such as payment card expiration date, personal identification number, payment card account holder's name and/or address) into the payment application 110 through an enrollment option available through the payment application 110. In turn, the payment application 110 sends this information to the payment system 112 for processing and to request a token. Thus, in some implementations, the payment application 110 may temporary store the payment card account number (and/or other information such as payment card expiration date, personal identification number, payment card account holder's name and/or address). However, after the user is enrolled in the program and/or after the payment application 110 receives the token, the payment application 110 deletes the payment card account number (and/or other information such as payment card expiration date, personal identification number, payment card account holder's name and/or address) from its memory (and/or the memory of the user device 106 on which it executes). Regardless, in some implementations, the account number is not available to the payment application 110 to complete purchases.

This enrollment process includes the payment system 112 generating (or having generated) the token for the user's payment card, and storing (or having stored) the token in association with the user's payment card (and/or account number) such that the payment system 112 can identify (e.g., uniquely identify) the payment card (and/or account number) from the token. The payment system 112 then sends or otherwise causes the token to be communicated to the payment application 110. In this way the payment application 110 stores and uses the token, and not the account number of the payment card, to facilitate transactions. Thus, in some implementations, only the payment system 112 can identify the payment card (and/or account number) from the token, which enhances the security of the transaction, for example, because (i) neither the payment application 110, the online store 200, nor the merchant of the store has access to the account number, and/or (ii) the account number is not transmitted across the network 102 during such transaction or needed by the payment application 110 or online store 200/merchant to complete the transaction.

Returning to FIG. 3, if the user selects element 306, in some implementations, the payment application 110 sends, e.g., across the network 102, identification of the online transaction and the payment token to the online store 200 to enable payment for Product A 204A. In turn, the online store 200 provides the token to the payment system 112 to process for payment. The payment system 112 uses the token to identify the payment card (and/or account) for the user to determine if the purchase can be authorized (e.g., determine if there are sufficient funds or credit). For example, the payment system 112 queries a database that stores tokens paired with corresponding accounts/payment cards by passing the token to the database and requesting the identity of the paired (e.g., matched) account/payment card. If authorized, the payment system 112 updates the user's account accordingly and notifies the online store 200 that the purchase is authorized.

If not authorized, payment system 112 notifies the online store 200 and/or the payment application 110 that the purchase is not authorized, which results in the purchase not being completed.

In some implementations, alternatively or additionally to the payment application 110 sending the token to the online store 200, the payment application 110 sends the token and reference to the online transaction to payment system 112 for processing. The payment system 112 looks up the payment card/account, performs payment, and then confirms with the payment application 110 that the purchase is complete. The payment application 110 in turn confirms with the online store 200 that the purchase is complete.

As mentioned above, the payment application 110 can be written through any of numerous well-known programming languages in a programming environment (e.g., programming software running on a data processing apparatus) to produce source code defining the steps and functionality of the payment application 110 discussed above (and below with respect to FIG. 4). The source code can then be complied through the programming environment into executable (object) code that can be executed by a user device 106. The payment system 112, or an associated system, can store this object code, constituting the payment application 110, for later distribution to user devices 106 as discussed above.

FIG. 4 is a flow diagram for an example method for conducting an online transaction. For example, the online transaction can include purchasing merchandise through an online store 200, using a payment application 110, as described above.

A request from a user device is received to purchase merchandise available through the online store (402). In some implementations, a user, using a computer (e.g., laptop or desktop computer user device 106) or a mobile device (e.g., mobile phone or tablet user device 106), accesses the online store 200 through the network 102 to purchase of products or services offered through the online store 200. For example, the web browser 108 of the user's user device 106 requests a web page of the online store 200 advertising (or offering) the merchandise the user is interested in. The online store 200, in turn, provides the requested web page to the user's mobile device 106 (e.g., which is rendered through the web browser 108). The user can then select to purchase Product A 204A from the online store 200 and choose to pay for the purchase through the payment application 110.

In response, the online store 200 accesses its database to determine if the database contains contact information for the user and/or user device 106 (e.g., email or instant message address or telephone number for a telephone call or text message). If such contact information is available to the online store 200, the online store 200 sends a communication to the user's mobile device (e.g., user device 106) with instructions concerning paying for the product or service through the payment application 110.

If such contact information is not available to the online store 200, the online store requests such information from the user (e.g., through a pop-up window presented to the user on the computer or mobile device 106). After receiving the requested information input by the user, the online store 200 sends a communication to the user's mobile device or computer (e.g., user device 106) with instructions concerning paying for the product or service through the payment application 110, as described below.

Instructions are provided to the user device to access a payment application (404). For example, in response to the user selecting the selectable element 210, the online store 200 (or payment system 112) sends a communication to the user device (e.g., mobile device or the computer causing the selectable element 210 to be selected) with instructions to access the payment application 110 for payment of the to-be-purchased merchandise.

The instructions can include information (e.g., a link) through which the mobile device can access (e.g., invoke and open) the payment application 110. In some implementations, the instructions include information about the transaction such as, for example, an identification of the item to be purchased, an identification of the online store 200, and the cost of the item to be purchased, or instructions to the payment application 110 to otherwise access such information (e.g., by querying the online store 200). If the mobile device does not have the payment application 110, in some implementations, the information includes instructions to obtain the payment application 110 such as, for example, instructions to obtain the payment application 110 from an application store accessible through the network 102.

If the payment application 200 needs more information about the transaction, the payment application will request and/or retrieve such information from the online store 200. For example, if the instructions from the online store 200 did not include the cost of the item to be purchased, the payment application 110 will request such information from the online store 200.

Payment information is received from the user device to purchase the merchandise (406). For example, the user uses the mobile device or computer (e.g., whichever user device 106 received the instructions) to access the instructions. If the user device 106 does not have the payment application 110 installed, the user device 106 can obtain the payment application 110 from, for example, an application store in accord with the instructions (e.g., a link to the payment application 110 at the application store), and then install and open the payment application 110. If the user device 106 has the payment application 110, the user device 106 can open the payment application 110 in accord with the instructions.

As discussed above, the payment application 110 receives a token representing certain payment card information of the user. In some implementations, once the user causes the payment application 110 to be opened and the payment application 110 has the token, as described above, the user can pay for the selected merchandise through the payment application 110 (e.g., with the "Pay Now" element 306 illustrated in FIG. 3). This causes the payment application 110 to provide the token to the online store 200 (and/or the payment system 112) for payment of the selected merchandise, as described above.

In some implementations, the payment application 110 does not have access to the token. Rather, the token is managed by native functionality of the user device 106. In this case, the payment application 110 requests that this native functionality send the token (and/or other payment information) to the online store 200 (and/or the payment system 112), or notifies the native functionality of the purchase transaction and the native functionality handles the transaction.

The payment information is used to complete the purchase of the merchandise (408). For example, the payment system 112 receives the token along with the relevant information about the desired purchase. In turn, the payment system 112 resolves the account number of the user's payment card (or otherwise identifies the user's account) from the token and determines whether the desired purchase is authorized. If authorized, the payment system 112 notifies the online store 200 and/or payment application 110 accordingly to complete the purchase transaction. As such, the merchandise is purchased without providing the merchant or the online store 200 with the account number of the payment card. Rather, from the perspective of the online store 200, merchant, and payment application 110, with respect to the account number and the token, only the token is needed to complete the purchase.

In some implementations, once the purchase is complete, the payment application 110 notifies the online store 200 that payment has been made.

In some implementations, the functionality of the payment application 110 can be provided through an extension. An extension is a software-based component that provides functionality that can be accessed by a given software application to provide functionality that is not part of that software application. But rather, the software application has access to that functionality by virtue of using the extension. For example, a given web browser does not have the functionality of the payment application 110. The web browser could invoke the extension such that, within the web browser, the payment application 110 functionality would be available. Then, from within the web browser, a user could pay for merchandise as described above without separately opening a payment application 110.

In such implementations, the user accesses the online store 200 through a web browser on the user's user device 106. The user selects merchandise to purchase and then selects to pay through payment application 110. In response, the web browser 108 invokes the extension making available the payment application 110 functionality. In some implementations, the extension causes the relevant purchase information to be pulled (or requested) from the online store 200 including, for example, merchandise cost. The web browser 108, through the extension, accesses the token and provides it to the online store 200 and/or payment system 112. The purchase authorization process continues as described above.

As noted above, the user device 106 can have native (e.g., built-in) hardware and/or software functionality that stores the payment information (e.g., the token). In some implementations, this native functionality carries out some or all of the secure transaction operations of the payment application 110 described above. For example, in some implementations, the payment application 110 functions primarily as an interface to the native functionality (e.g., through various application programming interfaces available through the user device and/or its operating system), and the native functionality provided the payment information to the online store 200 and/or payment system 112 to facilitate the purchase transaction.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a server, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, software or code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors (e.g., a data processing apparatus) executing one or more computer programs to perform actions by operating on input data and generating output.

Processors suitable for the execution of a computer program include, by way of example, both general and special purpose microprocessors, and any one or more processors of any kind of digital computer (e.g., data processing apparatus). Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) or an LED (light emitting diode) monitor, for displaying information to the user and a keyboard, touchscreen, and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers (e.g., a data processing apparatuses). A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, at one or more servers hosting an online store, a request to purchase merchandise available through the online store;
   providing, by the one or more servers, instructions to a user device to access a payment application to pay for the merchandise, wherein providing further includes sending the instructions in a link to the user device;
   responsive to the link being received on the user device, automatically activating, by the user device, the link and automatically invoking a non-web browser application on the user device as an executing instance of the payment application that executes on the user device;
   passing, by the one or more servers, control to the executing instance of payment application for providing payment information for the request to purchase merchandise;
   querying, by the executing instance of the payment application, the online store and obtaining transaction information for a transaction between the online store and a user who operated the user device;
   acquiring, by the executing instance of the payment application on the user device, the payment information that is associated with a payment card but the payment information lacks any account number that was included with the payment card;
   sending, by the executing instance of the payment application on the user device, the transaction information and the payment information to the one or more servers;
   receiving, by the one or more servers, the transaction information and the payment information from the user device to purchase the merchandise;
   obtaining, by the one or more servers, the account number associated with but missing from the payment information based on the transaction information and the payment information;
   verifying, by the one or more servers, that the account number of the user has sufficient funds and authorization for purchasing the merchandise;
   processing, by the one or more servers, the payment information with the account number and the transaction information to complete the purchase of the merchandise on behalf of the user;
   notifying, by the executing instance of the payment application, the online store that a payment for the merchandise was processed, authorized, and completed by one or more servers;
   performing secure payment processing to pay for the merchandise by preventing the account number from being transmitted over a network and by preventing acquisition of the account number by the online store.

2. The method of claim 1, wherein the payment information includes information from the payment card to complete the purchase of the merchandise.

3. The method of claim 1, wherein the executing instance of the payment application sends the payment information to the one or more servers by processing native functionality of the user device.

4. The method of claim 1, wherein processing the payment information to complete the purchase of the merchandise comprises completing the payment process for the merchandise without providing the account number of the payment card to the online store or a merchant of the online store.

5. The method of claim 1, wherein the user device is one of (i) a desktop or laptop computer or (ii) a mobile phone.

6. The method of claim 1, comprising:
   sending, by the one or more servers, a cost of the merchandise to the executing instance of the payment application.

7. The method of claim 1, comprising:
   receiving verifiable confirmation from the user device that payment for the merchandise has been completed directly with a payment system and information about the payment.

* * * * *